W. A. DUNCANSON.
SURGE RELIEVER OR SAFETY DEVICE FOR TOW LINES.
APPLICATION FILED JAN. 22, 1909.

957,315.

Patented May 10, 1910.

Witnesses.

Inventor:
W. A. Duncanson

UNITED STATES PATENT OFFICE.

WILLIAM ALONZO DUNCANSON, OF BOSTON, MASSACHUSETTS.

SURGE-RELIEVER OR SAFETY DEVICE FOR TOW-LINES.

957,315.  Specification of Letters Patent.  Patented May 10, 1910.

Application filed January 22, 1909. Serial No. 473,752.

*To all whom it may concern:*

Be it known that I, WILLIAM A. DUNCANSON, of Boston, in the county of Suffolk and State of Massachusetts, have invented certain new and useful Improvements in Surge-Relievers or Safety Devices for Tow-Lines, of which the following is a specification.

This invention relates to an elastic device adapted to be interposed between two inelastic sections of a tow line, which connects a tug or towing vessel with a barge or other vessel being towed, the said elastic device having provisions for relieving the sudden shock exerted upon it by independent movements of the two vessels due to wave action, and preventing or reducing to the minimum the liability of breakage of the tow line due to such shocks.

The invention has for its object to provide a safety device or surge reliever of improved construction which includes a spring adapted to be compressed by an increase in the strain on the tow line, and thus prevent a sudden and an injurious increase of strain upon the line, the construction being such that the device is adapted, when the limit of compressibility of the spring has been reached, to withstand the maximum strain exerted on the tow line.

The invention consists in the improvements which I will now proceed to describe and claim.

Figure 1:
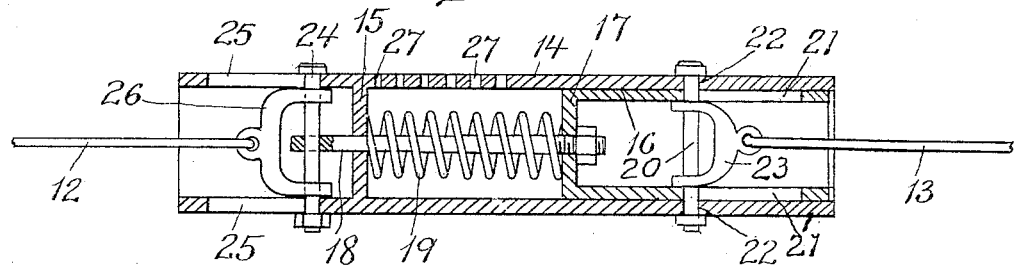
Figure 2:
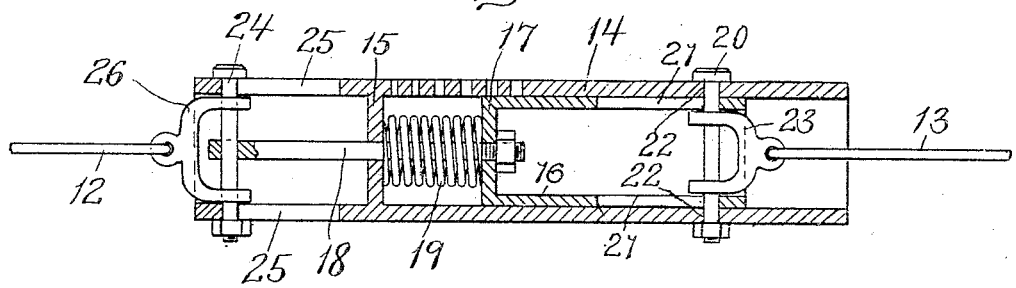

Of the accompanying drawings, forming a part of this specification,—Figure 1 represents a longitudinal section of a safety device embodying my invention, the device being shown in the adjustment which it normally assumes when no strain is exerted on the tow line. Fig. 2 represents a similar view, showing the device in the adjustment which it assumes when the maximum strain is exerted on the tow line.

The same reference characters indicate the same parts in both figures.

In the drawings, 12 and 13 represent two sections of a tow line between which my improved safety device is interposed. Said safety device comprises an outer tubular member 14 having an internal head or abutment 15, and an inner tubular member 16, which is slidable endwise in the member 14, and has a head 17 opposed to the fixed head 15 of the outer member. With the head 17 of the inner member is engaged a rod 18 which has a sliding fit in an orifice formed in the center of the head 15 of the outer member. 19 represents a spring which surrounds the rod 18, and bears upon the heads 15 and 17, the normal expansion of the spring separating the heads 15 and 17, as indicated in Fig. 1.

20 represents a bolt which passes through longitudinal slots 21 in the inner member 16, and orifices 22 in the outer member 14, said orifices and slots being arranged to coincide, said bolt being connected by a clevis 23 with the tow line section 13.

24 represents a bolt which is slidable in slots 25 formed in the outer tubular member 14, said bolt passing through a socket formed for its reception in the outer end of the rod 18, and having a clevis 26 which is connected with the tow line section 12.

When the tow line is not under strain, and the spring 19 is expanded, the inner ends of slots 21 bear against bolt 20, and the bolt 24 bears against the inner ends of the slots 25, as shown in Fig. 1. When a strain is exerted on the tow line sufficient to compress the spring 19, the heads 15 and 17 are moved toward each other, thus causing the compression of the spring 19, and at the same time, the member 16 is moved to bring the outer ends of the slots 21 toward bolt 20, and the bolt 24 is moved toward the outer ends of the slots 25.

The described movement of the parts is resisted and made gradual by the spring 19. When the limit of the compressibility of the spring is reached, the outer ends of the slots 21 are against bolt 20, and the bolt 24 comes at the same time to a bearing on the outer ends of the slots 25, as indicated in Fig. 2. The strain on the tow line is therefore supported at six points, viz:, the outer ends of the two slots 21, the outer ends of the two slots 25, and the outer sides of the two orifices 22, a plurality of abutments for the bolts 20 and 24 being thus provided when the spring is fully compressed. This division of the support of the maximum strain exerted on the tow line prevents liability of the breakage of the safety device, the strength of the latter being adequate to any strain that can be sustained by the tow line sections 12 and 13.

The clevises 23 and 26 distribute the strain on the bolts 20 and 24, and maintain said bolts substantially at right angles with the longitudinal axis of the tubular members, so that there is no liability of the bolts becoming inclined relatively to said axis, and sticking or binding in the slots in which they are movable.

It will be seen that the heads 15 and 17 and the portion of the outer tubular member 14 intervening between said heads, constitute a chamber which contains the spring 19, said chamber being adjustable in length by the movement of the heads relatively to each other. The portion of the outer tubular member 14 constituting the wall of said chamber is preferably provided with orifices 27 which permit the entrance of water into the said chamber when the heads are moving from each other, and the exit of water therein when the heads are moving toward each other. When the advice is in the adjustment shown in Fig. 1, the heads 15 and 17 being at their maximum separation, the chamber formed by said heads and the intervening portion of the tubular member 14, is filled with water, assuming that the device is at such a portion of the tow line that it will be submerged when in use. It will be seen, therefore, that when the said chamber is contracted by the movement of the heads 15 and 17 toward each other, the water will be expelled through the orifices 27, its expulsion being gradual and retarding the inward movement of the heads, means being therefore provided for aiding the spring 19 in causing a gradual absorption of violent shocks exerted on the tow line.

It will be seen that the described construction provides a telescopic device, the inner and outer members 14 and 16 of which are normally extended by a spring, bolt 20 being slidable with the outer member relatively to the inner member, and bolt 24 slidable with the inner member relatively to the outer member, said bolts being provided with means, as the clevises 23 and 26, for engaging two tow line sections, and a plurality of abutments (formed by portions of the slots 21, 25, and of the orifices 22) which collectively bear the strain on the tow line when the spring is compressed to a predetermined extent, the said abutments preventing further and injurious compression of the spring.

The invention is not limited to the means for retarding the compression of the spring by liquid introduced between the heads 15 and 17, although I regard this as a desirable feature. The heads 15 and 17 may, however, be constructed to serve simply as supports for the rod 18, and as abutments for the spring instead of being of water tight construction, in which case the orifices 27 may be omitted. Said orifices are preferably graduated in size, as shown, the arrangement being such that as the liquid chamber is contracted, the larger orifices are successively closed by the inner member 16.

I claim:

1. A safety device of the character stated, comprising an outer tubular member having a fixed internal head and longitudinal slots adjacent one end, an inner tubular member slidable lengthwise in the outer member and having a head at one end portion, and slots adjacent the other end, a rod engaging with said head and having a sliding fit in the head of the outer member, a bolt engaged with said rod and movable in slots of the outer member, a bolt carried by the outer member and movable in slots in the inner member, said bolts having means for engagement with tow line sections, and a spring interposed between the said heads and adapted to be compressed by an increase of strain on the tow line, the said slots and orifices providing a plurality of abutments for said bolts which limit the compressibility of the spring.

2. A safety device of the character stated, comprising inner and outer telescopic members provided with opposed internal heads forming the ends of an adjustable liquid chamber, the outer member having orifices communicating with said chamber, a spring which normally extends said members, and bolts slidable with each member relatively to the other member, and provided with means for engaging tow line sections, the liquid contained in said chamber retarding the compression of the spring when strain is exerted on the tow line.

In testimony whereof I have affixed my signature, in presence of two witnesses.

WILLIAM ALONZO DUNCANSON.

Witnesses:
C. F. BROWN,
P. W. PEZZETI.